2,960,498

PARTIAL GLYCEROL ESTERS OF PECTIC SUBSTANCES AND PREPARATION THEREOF

Urs F. Nager, Royal Oak, Mich., assignor to Oliver W. Burke, Jr., Grosse Pointe Park, Mich.

No Drawing. Filed Apr. 2, 1956, Ser. No. 575,334

9 Claims. (Cl. 260—209.5)

This invention is concerned with new derivatives of pectic substances including pectin, pectic, pectinic and polygalacturonic acids including the hereinafter mentioned salts thereof having a free carboxyl content of 0.4 to 1.2 milliequivalents per gram and the remaining carboxyl groups rendered non-acidic by esterification with a water soluble hydroxylated compound, esterification with a plurality of water soluble hydroxylated compounds and their combinations.

More particularly it relates to the aforementioned derivatives of pectic substances wherein the water soluble hydroylated compound is glycerol, the plurality of hydroxylated compounds a mixture of glycerol and methanol and their combinations which, for the sake of brevity, are referred to hereinafter as "partial esters of pectic substances" and more specifically is meant the partial glycerol ester of pectic substances and mixed partial glycerol and methyl ester of pectic substances.

This invention is further concerned with the preparation of such partial esters of pectic substances. These partial esters have been found to have useful properties. For example, as compared to known degraded pectins, inter alia, they form colloidal solutions over wider ranges of concentration in aqueous media, facilitate control of viscosity of such aqueous solutions at different molecular weights of the solute, and do not form precipitates by ion exchange with calcium. The new materials are useful in fields in which these properties are desirable and in the fields in which pectins, pectic substances and degraded pectic substances are employed, e.g. in the production of viscous solutions. In addition, the new materials have been shown to be effective agents for blood plasma volume expansion and replacement in normovolemic and oligemic dogs, and for producing certain pharmacological effects in monkeys, inter alia, as hereinafter set forth.

Among the important objects of the invention are the provision of new and useful partial esters of pectic substances, and the provision of new and economical methods for the production thereof. Other objects and advantages of the invention will be apparent from the following detailed description.

The products of this invention are based on naturally occurring pectic substances or derivatives prepared therefrom which are defined as follows, in conformance with the Revised Nomenclature of the Pectic Substances adopted in 1944 (Chemical & Engineering News, April 25, 1944, page 609):

"Pectic substances" is a group designation for those complex, colloidal carbohydrate derivatives which occur in, or are prepared from, plants and contain a large proportion of anhydrogalacturonic acid units which are thought to exist in a chain-like combination. The carboxyl groups of polygalacturonic acids may be partly esterified by methyl groups and partly or completely neutralized by one or more bases.

"Pectinic acids" is a group designation for colloidal polygalacturonic acids containing more than a negligible proportion of methyl ester groups. Pectinic acids under suitable conditions are capable of forming gels (jellies) with sugar and acid or, if suitably low in methoxyl content, with certain metallic ions. The salts of pectinic acids are either normal or acid pectinates.

"Pectin" (or pectins) is a general term designating those water soluble pectinic acids of varying methyl ester content and degree of neutralization which are capable of forming gels with sugar and acid under suitable conditions.

"Pectic acid" is a term applied to pectic substances mostly composed of colloidal polygalacturonic acids and essentially free from methyl ester groups. The salts of pectic acid are either normal or acid pectates.

In accordance with the present invention, free carboxyl groups of polygalacturonic acid and its partial methyl ester are blocked by esterification with alcohols containing hydrophilic groups.

The hydrophilic groups change the nature of the material from a colloidal suspension to a colloidal solution, render the material more soluble over a greater range, and render the material incapable of forming insoluble calcium salts by ion exchange.

Especially suited for this esterification with hydrophilic groups is glycerol because of its non-toxicity. Although esterification may be directed to block essentially all free carboxyl groups, the present research has shown that preparations from pectic substances having esterification degrees in the range of 70 to 90% have definite advantages when used as a blood plasma extender in normovolemic and oligemic dogs, and especially that a free carboxyl content of about 24 to 26 milliequivalents per liter of solution is essential to attain adequate oncotic pressure for such use. Such range of free carboxyl content may be attained by a number of combinations of degree of esterification and concentration. Indeed, the pectin sols of prior art with 62% esterification and at 1.5% concentration would satisfy the requirement for adequate oncotic pressure, if this were the only matter to be considered. However, for a satisfactory blood plasma extender for normovolemic and oligemic dogs, applicant has found that the critical useful range is limited by two factors, (a) the threshold for calcium precipitation (at about 60% esterification in the case of a glycerol pectate) and (b) the maximum permissible relative viscosity of the solution (at about 5% concentration for such case), and these limits distinguish, inter alia, the extenders of the present invention from previously known pectin sols which fall within the region of calcium precipitation.

The glycerol ester of pectic substances may be prepared by reacting pectic substances with 2,3-epoxy-1-propanol, more commonly known as glycidol.

Rather than first to prepare the starting materials from fruit or vegetable sources, it is more convenient to use commercially available raw materials such as pectic acid, product #75 (technical grade; guaranteed free carboxyl content equivalent to at least 60% anhydrogalacturonic acid; manufactured by Sunkist Growers, Ontario, Calif.), polygalacturonic acid, product #491 (pharmaceutical grade; guaranteed free carboxyl content equivalent to at least 85% anhydrogalacturonic acid; Sunkist Growers) or any commercial pectin, in particular preparations conforming to specifications set forth in the National Formulary, the so-called pectin N.F.

The esterification reaction of pectic substances may be carried out in presence of an excess of water, the aqueous procedure, wherein the glycerol esterified product is soluble. From this reaction mixture, the ester may then be recovered by precipitation with an organic solvent. It has been found in the present research that the esterification may be performed more conveniently and more economically by using a heterogeneous procedure wherein (a) a suitable organic solvent, e.g., methanol, is employed instead of a major portion of the excess of water used in the said aqueous procedure, and wherein (b) the esterified product is insoluble. This improvement permits esterification in suspension rather than in solution. The advantages of this preferred new procedure developed by present research are two-fold: (a) much less esterifying agent is required to attain a given degree of esterification than with the aqueous solution procedure wherein large amounts of esterifying agent are destroyed due to the hydrolytic action of water, and (b) the esterified product may be conveniently isolated by filtration whereas in the aqueous solution technique the products of reaction have to be precipitated with suitable organic solvents for recovery.

As only the free carboxyl groups of pectic substances including their partial methyl ester react with glycidol it may be desirable to remove from the starting material before esterification the bulk of inorganic salts and salt-forming cations, and this may be accomplished by an acid-alcohol rinse. Pectic substances when purified in this manner furnish highly esterified glycerol ester, e.g., glycerol polygalacturonate of 95% esterification and better. The present inventor has shown that esters of any desired degree of esterification, e.g., 85% ester content, may be prepared either by esterification of an appropriate partial salt of pectic substances or their partial methyl ester or by appropriate partial saponification of a highly esterified glycerol ester or mixed glycerol and methyl ester of pectic substances.

The pectic starting material for the derivatives described in this disclosure, including pectin, pectic, pectinic and polygalacturonic acids, are usually found to have a relatively high degree of polymerization. Since a suitable plasma replacement for normovolemic and oligemic dogs should have an average molecular weight of the order of that of serum albumin, appropriate adjustments of molecular weight of the pectic ester may be required to adapt it for such use, e.g., to a range of 40,000–100,000 number average molecular weight. The lyophilized product from Example V had a number average molecular weight of 62,000. It has been found possible in the present invention to depolymerize the starting materials to such an extent that, upon esterification with glycidol, esters of such molecular weight are obtained; but it is preferred to depolymerize the derivatives, at least partially, subsequently to esterification. Depolymerization may be accomplished by methods known in the art as thermal (including infra-red heating), enzymatic, ultrasonic and oxidative degradation. For example, a 4% solution of the partial glycerol ester of polygalacturonic acid may be thermally degraded at 100° C. for several hours until the relative viscosity in comparison with water is reduced to about 4 to 5, or it may be preferred to autoclave at 125° C. a 3% solution of the partial mixed glycerol and methyl ester of polygalacturonic acid for a comparatively shorter period of time to a final viscosity of about 4 to 5. The autoclaving procedure is preferred when heat sterilization is desired. As thermal degradation is accompanied by some color formation it may be desirable to decolorize the degraded solutions. Although various decolorization methods known in the art may be employed for this purpose, in the present invention it was found preferable to treat said solutions with chlorine dioxide for purposes of decolorization, decomposition of proteinaceous impurities, and also chemical sterilization.

From the standpoint of storage prior to use the dry product, e.g., lyophilized material, is preferred since the storage time and temperature of storage have no practical effect on the stability of the dry product. The dried product is readily converted to a solution, e.g., with sterile saline solution. For example, a glycerol pectate solution which has been lyophilized in a standard bottle of the type used for handling sterile plasma expanders, produces a material the physical condition of which is such that the pectate returns to solution immediately upon shaking with the appropriate amount of sterile isotonic saline solution. The physiological salts employed in preparing the isotonic salt solution can also be included with the glycerol pectate being lyophilized; then only sterile water is used in preparing the solutions for injection as hereinafter exemplified.

Thus, by use of dry glycerol pectate possible slow drifting of pH experienced with glycerol pectate solutions is entirely avoided, and no pH adjustment prior to such injection is required.

The following examples illustrate this invention and disclose methods for preparing the novel compounds. The first example illustrates the aqueous method of preparation of a partial glycerol ester from a commercial pectic acid and its adaptation for use as a plasma volume expander for normovelmic and oligemic dogs. The second example discloses a heterogeneous method of preparting the partial glycerol ester of pectin for similar use. Examples III and IV illustrate the preparation of partial glycerol esters of pectic and polygalacturonic acids by the heterogeneous esterification method from a technical grade (Example III; pectic acid #75, a partially decarboxylated polygalacturonic acid) and from a pharmaceutical grade (Example IV; polygalacturonic acid #491) polygalacturonic acid. Example V describes a typical preparation of a partial glycerol ester of pectic acid wherein the ester product is lyophilized as a final step prior to preparation of the clinical solution for such use.

EXAMPLE I (AQUEOUS ESTERIFICATION METHOD)

A mixture of 2.4 kg. of pectic acid #75 (Sunkist Growers), 4.8 kg. of glycidol and 11 liters of distilled water is stirred at 40° C. for 24 hours. The syrupy reaction mixture is then treated with 4 liters saturated chlorine dioxide solution and kept at room temperature in the dark for 48 hours. The bleached solution is diluted with 3 liters of distilled water, then filtered in the presence of a small amount of diatomaceous filter aid, and the filtrate is treated with an equal volume of acetone under vigorous agitation. Crude partial glycerol ester of pectic acid separates which is isolated by decanting the supernatant liquid, washing the precipitate several times with acetone by suspension and decantation, and finally by collecting by means of filtration. The crude ester is then purified by redissolving the wet filter cake in 24 liters of distilled water with stirring and by treating the resulting solution with an equal volume of acetone. A solution of 50 grams of sodium chloride in 150 ml. of water may be added to enhance precipitation. The supernatant liquid is removed by decantation and the precipitate is washed by reslurrying several times in acetone, decanting the spent acetone after each rinse. The precipitate is then collected by filtration and dried in vacuo over anhydrous calcium chloride. The product is a salt of a purified partial glycerol ester of pectic acid with an esterification degree of about 90%. Yield, 2.1 kg. This product dissolves very readily in water to colorless viscous solutions of substantially neutral reaction.

In preparing solutions suitable for intravenous administration (for use as plasma volume expander as aforesaid), 160 g. of the purified glycerol ester of pectic acid are dissolved in 4 liters of sterile 0.9% saline solution at 95–98° C. The resulting solution is clarified by filtration in the presence of diatomaceous earth, and the filtrate is heated at 100° C. for a sufficient length of time to lower the relative viscosity against water into the range of about 4.0 to 4.5. The degraded material is cooled to room temperature and treated with 60 ml. of saturated chlorine dioxide solution. Alkali, e.g., sodium bicarbonate, is then added in amounts sufficient to neutralize the bleached solution and to adjust the degree of esterification to 85% by appropriate partial saponification. The final solution is then immediately transferred to evacuated, sterile pint bottles preferably of the type designed for intravenous administration.

EXAMPLE II (HETEROGENEOUS ESTERIFICATION METHOD)

Commercial pectin N.F. is pretreated by washing with 75% isopropanol containing 3% by volume of concentrated hydrochloric acid. Four liters of this alcohol-acid mixture per kg. pectin are used in the first wash, three liters in the second, and each time the mixture is agitated for about one-half hour followed by filtration. Excess mineral acid is then removed by washing the solids several times with 75% isopropanol by suspension and decantation. The rinsed solids are then collected by means of filtration, dehydrated with acetone and dried in vacuo over anhydrous potassium hydroxide. Instead of acetone, methanol may be used in dehydrating the solids, and the product obtained in this manner may be directly esterified without prior drying.

A mixture of 2 kg. of pretreated pectin, 4 liters of methanol, 1 kg. of glycidol and 200 ml. of distilled water is stirred at 50° C. for a period of 20–24 hours. The esterified pectin is then isolated by filtration, repeated washing with methanol followed by acetone, and drying. This glycerol ester of pectin is a mixed glycerol and methyl ester of polygalacturonic acid having a total esterification degree of about 95% or better (the methyl ester is derived only from the pectin).

In preparing solutions suitable for intravenous administration as aforesaid, 420 grams of ester so prepared and 126 grams of sodium chloride are dissolved in 13.2 liters of distilled water at 95–98° C., and the resulting mixture is autoclaved at 15–16 pounds steam pressure for 80 minutes. The filtered solution containing the degraded ester is then treated with 600 ml. saturated chlorine dioxide solution (approx. 0.3%) and 182 ml. 1-N sodium bicarbonate. The mixture is briefly agitated and then immediately transferred to suitable, sterile containers. The final product is a clear solution in 0.9% saline of the sodium salt of the mixed glycerol and methyl ester of polygalacturonic acid having a total esterification degree of about 85% and a relative viscosity of 4.5. If a dry product is preferred the solution just described may be lyophilized, spray dried or drum dried, under aseptic conditions for such use.

EXAMPLE III (HETEROGENEOUS ESTERIFICATION METHOD)

A mixture of 4 kg. pectic acid #75, 10 liters of methanol, 500 ml. of water and 3.3 kg. of glycidol is agitated at 60° C. for 22 hours. The glycerol ester of pectic acid, herein referred to as glycerol pectate, obtained is isolated by filtration, rinsing with methanol and acetone followed by drying. About 6 kg. of crude glycerol pectate (partial glycerol ester of pectic acid #75) are obtained.

Crude glycerol pectate (3.6 kg.) is dissolved by agitation in hot distilled water (37.5 liters), and the solution is kept at 98° C. for a period of about one hour. After cooling to about 50–60° C. this solution is bleached with chlorine dioxide solution (3.6 liters of about 0.3% concentration) and then clarified by centrifugation. After standing to complete bleaching, to the clarified solution is added an equal volume of acetone with vigorous agitation whereby glycerol pectate is precipitated. Said precipitate is freed from the majority of mother liquor by decantation, then redissolved in distilled water (37.5 liters) and reprecipitated with an equal volume of acetone. Said twice precipitated glycerol pectate, freed from most of the mother liquor by decantation, is re-slurried several times with fresh acetone and decanted to remove the remainder of adherent mother liquor and is then isolated by filtration, additional rinsing with acetone and drying. About 2.5 kg. of purified glycerol pectate is obtained.

In preparing solutions suitable for intravenous administration for blood plasma extension and replacement in normovolemic and oligemic dogs, said purified glycerol pectate is further processed as described in Example I.

EXAMPLE IV (HETEROGENEOUS ESTERIFICATION METHOD)

A mixture of 300 g. polygalacturonic acid #491, 600 ml. of methanol, 200 grams of glycidol and 30 ml. of water is stirred at 60° C. for 42 hours. Glycerol polygalacturonate is formed which is isolated by filtration, repeated washing with methanol and acetone followed by drying. The product (370 g.) is a partial glycerol ester of polygalacturonic acid with an esterification degree of about 70%.

EXAMPLE V (AQUEOUS ESTERIFICATION METHOD)

Example I was repeated. The dried product therefrom (160 grams) was dissolved in sterile water (4 liters) at 95–98° C., the resulting solution was clarified by filtration in the presence of diatomaceous earth, and the filtrate was heated at 100° C. for a sufficient length of time to lower the viscosity to about 4.5. The solution was then cooled to room temperature and was treated with 60 ml. of chlorine dioxide solution (0.3%). Sodium bicarbonate solution was added to adjust the degree of esterification to 83% and the final solution was transferred to sterile pint bottles of the type designed to contain material for intravenous administration.

The final step in the preparation of the dry glycerol pectate was then carried out by lyophilization, i.e., drying in the frozen state wherefrom the moisture was removed under high vacuum by sublimation. The glycerol pectate solutions after transferral to the said sterile pint bottles were frozen by placing the bottles into a freezing unit at about −30° C., wherein the bottles were rotated so that a uniform deposition of the frozen materials was obtained in the form of a shell on the inner walls of the bottles. The bottles were then attached via adapter tubes to the lyophilization chamber under a maintained high vacuum. The lyophilization chamber was provided with a condenser maintained at −60° C., which served to "freeze out" on the condenser surfaces the water as it sublimed from the frozen glycerol pectate in the said bottles. The freezing out of the water was essential for maintaining the low vapor pressure required for expeditious drying of the glycerol pectate. After 24 hours at 50 microns pressure, a dry white glycerol pectate product remained as a porous layer on the walls of the bottle.

A simple device was provided for closing and sealing the bottle under vacuum at the completion of the lyophilization so that the bottled contents remained sterile afer closure. The sealed bottle, was stored until immediately prior to usage, at which time a pint of 0.9% saline solution was added to the glycerol pectate by a hypodermic needle insertion and the bottle was shaken rapidly to dissolve the said pectate and produce a solution of the desired viscosity and concentration.

Materials prepared by the procedure of Examples I, III and V were evaluated in physiological studies, results of which are summarized hereinafter.

Physiological studies

Dr. S. W. Handford et al., J. Appl. Physiol. 7, 553–576 (published April 28, 1955), have shown that intravenous infusion of the products of this invention (which were manufactured and furnished to him for physiological tests by the present inventor) into post-hemorrhagic and normovolemic dogs, monkeys and rodents results in:

(1) Effective plasma volume replacement and expansion that persist for at least 12 hours' postinfusion.

(2) Restoration and maintenance of blood pressure in bled dogs.

(3) Sustained hemodilution evidenced by lowered hematocrit and dilution of plasma proteins.

(4) Rapid excretion of approximately 50 percent of the material presumably by glomular filtration.

(5) No pathology or storage phenomena in dogs and such other mammalian species (mice, rats, rabbits) that may be attributed directly to the material infused.

(6) No significant alteration in clotting or bleeding times of dogs and monkeys, or in the osmotic fragility of erythrocytes.

The methods and procedures of Dr. Handford are given in detail in the above designated publication and are omitted herefrom for the sake of brevity.

Furthermore, the present inventor has established that the products of this invention are adequately stable in the presence of blood and do not incur significant chemical changes while in contact with body tissues; they can be detected in essentially unchanged forms in the urine of the aforesaid animals following their excretion when no longer needed in the maintenance of blood pressure and plasma volume after hemorrhage.

Additional tests were made by Dr. G. A. Feigen (director of ONR, Contract N6 ONR 25137), regarding possible development of antigenicity following repeated infusions of the products of this invention. In his studies six guinea pigs were injected with glycerol pectate (2 injections each of 10 mg.) and six with glycerol pectate and purified ovalbumin (2 injections each of 10 mg. glycerol pectate plus 10 mg. of ovalbumin). A third group served as the control. These animals were sacrificed within one-half to three months after injection and their guts employed for determination of sensitivity by the Schultz-Dale test. None was found to react with glycerol pectate whereas all of the animals injected with ovalbumin reacted specifically for the latter antigen alone. Glycerol pectate was thus non-antigenic under the experimental conditions of this test.

LIST OF EXPERIMENTAL MAMMALS EMPLOYED IN EVALUATION STUDIES

Mice (White Swiss strain)
Rats (Wistar strain)
Guinea pigs
Rabbits (Dutch and hybrid)
Dogs (mongrel)
Monkeys (*Macacus rheus*)

Glycerol pectate prepared from N.F. pectin and glycidol was demonstrated to hydrolyze in the presence of blood to the extent of about 8% during the time of functioning as a plasma volume extender in maintenance of normal blood pressure in such mammals. The end-products of such hydrolysis are glycerol and pectin.

Pectin has been demonstrated to be non-toxic when injected into the blood stream of humans as evidenced by the studies of Dr. F. W. Hartman (loc. citation). Diluted glycerol has been similarly demonstrated to be non-toxic when injected intravenously.

It was observed that the animals which had been infused with the glycerol pectate solutions showed improved health; their fur appeared glossier, they showed more than normal animation, and in cases of distemper, they showed notable improvement with respect to the systemic infection.

The new derivatives of this invention also include those of pectic substances having a total free carboxyl content of 0.4 to 1.2 milliequivalents per gram, and that may be neutralized with bases from the class consisting of sodium hydroxide, potassium hydroxide, the alkali salts of sodium, the alkali salts of potassium, ammonia, basic amino acids, and combinations thereof, so as to be present as salt groups, while the remaining carboxyl groups of the starting material are rendered non-acidic in the derivatives by one or more reactions selected from the class consisting of complete or partial decarboxylation, complete or partial reduction, partial esterification with a water soluble hydroxylated compound comprising 2 to 6 carbon atoms and partial esterification with a plurality of water soluble hydroxylated compounds at least one of which comprises from 1 to 6 carbon atoms.

While there have been described herein what are at present considered preferred embodiments of the invention, it will be obvious to those skilled in the art that minor modifications and changes may be made without departing from the essence of the invention, the scope of which is defined in the appended claims, and that all modifications that come within the meaning and range of equivalency of the claims are intended to be included therein.

I claim:

1. A glycerol ester of pectic substances having a free carboxyl content of 0.4 to 1.2 milliequivalents per gram.

2. A derivative of a pectic substance according to claim 1, in which the free carboxyl groups are neutralized with basic material selected from the class consisting of sodium hydroxide, potassium hydroxide, the alkali salts of sodium, the alkali salts of potassium, ammonia, basic amino acids and combinations of the foregoing.

3. A derivative of a pectic substance according to claim 2, dissolved in water and lyophilized.

4. A derivative of a pectic substance according to claim 2, with a number average molecular weight between 40,000 and 100,000.

5. A glycerol ester derivative of pectic substance having a reduced free carboxyl content lying in the range of 0.4 to 1.2 milliequivalents per gram.

6. A process of producing glycerol ester of pectic substances that consists essentially in conducting the esterification of the pectic substances with glycidol in the presence of a relatively small proportion of water and a relatively large proportion of an inert organic diluent in which the glycidol is soluble and the pectic substances and their glycerol esters are insoluble, and separating the insoluble reaction products from the diluent.

7. A process according to claim 6 in which less than all of the carboxyl groups of the pectic substances are esterified with the glycidol.

8. A process according to claim 6 in which the degree of esterification is adjusted by addition of alkali from the class of compounds consisting of sodium hydroxide, potassium hydroxide, ammonia, the basic amino acids and combinations of the foregoing, and in amounts from 0.4 to 1.2 milliequivalents per gram of esterified pectic substances.

9. A process according to claim 6 and degrading the resulting polymeric material to a relative viscosity of 4.0 to 4.5 in 2 to 6% aqueous solution.

References Cited in the file of this patent

UNITED STATES PATENTS

| | | |
|---|---|---|
| 2,196,199 | Dyckerhoff | Apr. 9, 1940 |
| 2,281,989 | Parfentjev | May 5, 1942 |
| 2,411,897 | Sahyein | Dec. 3, 1946 |
| 2,426,125 | Steiner | Aug. 19, 1947 |
| 2,437,518 | Gronwall et al. | Mar. 9, 1948 |
| 2,478,170 | Maclay et al. | Aug. 9, 1949 |
| 2,522,970 | Steiner et al. | Sept. 19, 1950 |
| 2,589,226 | Carson | Mar. 18, 1952 |
| 2,599,564 | Lee et al. | June 10, 1952 |

OTHER REFERENCES

Report No. 21, Burke Research Company, Van Dyke, Michigan, article entitled "Glycerol Pectate as a Blood Plasma Replacement," published Jan. 31, 1954, pages 5 to 9.